United States Patent [19]

Chen

[11] Patent Number: 5,022,069
[45] Date of Patent: Jun. 4, 1991

[54] MODULAR AUTOMATIC TELEPHONE SWITCHING SYSTEM

[76] Inventor: Abraham Y. Chen, 2035 Tripiano Ct., Mountain View, Calif. 94040-3870

[21] Appl. No.: 312,742

[22] Filed: Feb. 21, 1989

[51] Int. Cl.$^5$ .................... H04M 3/22; H04M 3/50; H04M 3/58

[52] U.S. Cl. .................................. 379/67; 379/84; 379/157; 379/212; 379/233; 379/269; 379/379

[58] Field of Search ............... 379/165, 157, 269, 67, 379/88, 212, 214, 379, 386, 233

[56] References Cited

U.S. PATENT DOCUMENTS 4,338,495  7/1982  Bloch et al. ..................... 379/158

FOREIGN PATENT DOCUMENTS 0171894  9/1985  Japan ............................ 379/157

Primary Examiner—Thomas W. Brown
Attorney, Agent, or Firm—Baker & McKenzie

[57] ABSTRACT

A modular switching system for terminating and originating calls between central office subscriber lines and local stations provides the appearance of a business environment to an establishment served by one or more central office lines and as few as one local station. Central office lines may comprise standard subscriber lines or PBX trunks. The switching system includes one or more master switching units (102, 112) equal in number to the central office lines which are seved by the system; and a plurality of station switching subsystems (120, 130) corresponding in number to the local stations served by the switching system. Each master switching unit includes a main port for connection to a telephone answering device (TAD). A TAD comprises a manual attendant's module and/or an automatic telephone answering set to provide a recorded audio announcement (OGM) which advises a calling party how to proceed to complete a call to a particular local station served by the called central office number. In response to subsequent DTMF call signalling information received from the associated central office subscriber line, the mast switching module disconnects the TAD from the central office line; and connects the calling central office line to a local station defined by the received call signalling information.

9 Claims, 6 Drawing Sheets

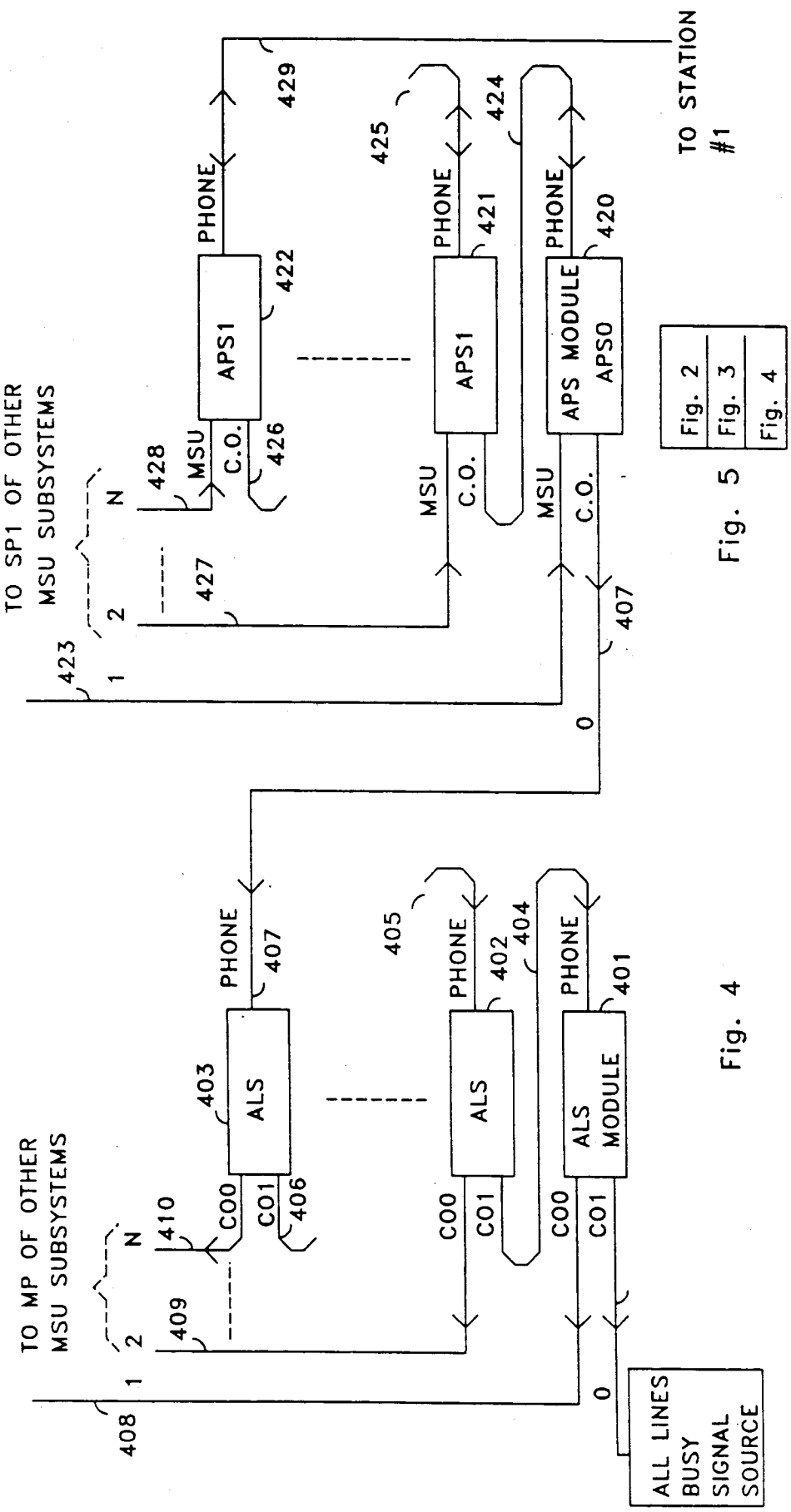

MODULAR AUTOMATIC TELEPHONE SWITCHING SYSTEM

TECHNICAL FIELD

This invention relates to on-premises telephone switching systems.

BACKGROUND OF THE INVENTION

Traditionally, telephone switching systems rely upon sharing of control and switching facilities to achieve economy of cost. Such sharing is found in both central office machines, and in on-premises PBX's and intercom systems. The advent of low cost, relatively high speed functional processors has permitted the construction of relatively low cost on-premises switching machines with extensive lists of features for a business environment, and a number of manufacturers provide on premises line switching systems which serve from two to twelve central office lines and from eight to thirty two stations. Such systems generally rely upon the use of relatively high cost, proprietary station sets to achieve many of the system features along with two or more wire pairs to each station. The "get started cost" of the processing unit of such systems; the costs of required line cards and subscriber cards; and the high costs of the proprietary station sets and multi-pair station wiring are too high for application in a small business or in a residence setting.

A private branch exchange (PBX) and an end telephone office serving the PBX are interconnected by one or more trunk circuits. The trunk circuit or trunk circuits are identified in the national telephone numbering plan by a ten digit code. The PBX extensions are not identified in the national numbering plan; however, the PBX extensions are identified by a numbering plan which is local to the PBX. Incoming calls from a central office to a PBX are directed to an attendant position. The attendant answers an incoming call and completes the call to an extension as requested by the calling party. The calling party may identify the desired extension by its PBX extension number or the calling party may only identify an area of interest e.g., the service department and the attendant directs the call to the appropriate extension.

With the advent of DTMF calling from subscriber stations, numerous features have been added to both central office and on-premises intercom and PBX telephone switching systems. One such feature which has gained favor is termed "automated attendant service". This service, which is generally provided as an adjunct to an on-premises private branch exchange (PBX), is intended to relieve the duties of an attendant in serving calls which are incoming to the PBX.

In a dial PBX, extension to extension calls can be completed without the services of an attendant; however, prior to the availability of "automated attendant services", incoming calls to PBX extensions required the services of a local attendant.

In a PBX served by automated attendant services, upon the occurrence of an incoming call from a central office, the incoming trunk circuit is terminated to trip the ringing signal in the central office and a source of a recorded outgoing message (OGM) is connected to the trunk. The message advises the calling party to use the DTMF pad on their telephone to complete the call to a desired extension or to a particular area of the business e.g., the service department. Such systems generally provide access to the PBX attendant by the keying of a specific number, or as a default in the event that a number is not received from the calling party within a specified timeout period of time. This feature is provided because the calling party may have a pulse telephone and cannot provide call signalling to the PBX.

U.S. Pat. No. 4,696,028, which was issued on Sept. 27, 1987, discloses a "PBX INTERCEPT AND CALLER INTERACTIVE BYPASS SYSTEM" which provides automated attendant services as an adjunct to a PBX. Accordingly, the apparatus of this invention requires the presence of an independent PBX. Arrangements such as those shown in the above noted patent, as a basic design concept, rely on centralization for sharing use of facilities. Accordingly, these prior art systems are committed to a relatively large minimum system configuration which is not economical in a residence or in a small business environment.

On-premises intercom systems which connect to a business or residence central office subscriber line, as opposed to a central office trunk, provide certain PBX-like functions in a small business or residence environment; however, the costs associated with the presently available systems, and particularly the cost of the required proprietary station sets and multi-pair station wiring, mitigate against their use.

DISCLOSURE OF THE INVENTION

In accordance with my present invention, a modular switching system, which serves standard telephone station sets, comprises: one or more independent master switching units (MSU) corresponding in number to the number of central office lines (subscriber lines or trunks). Each master switching unit comprises: a central office port; a main port; a plurality of station ports for connection to local station apparatus; switching means for selectively interconnecting the central office port, the main port, and the station ports; connecting means for selectively interconnecting the station ports; and control means for controlling the switching means and the connecting means.

In the case of a low cost system with a single central office line and a corresponding single master switching unit in accordance with my invention, the local station apparatus comprises standard two wire telephone stations sets connected directly to corresponding station ports of the master switching unit.

In the case of a switching system which comprises a plurality of master switching units serving a corresponding plurality of central office lines, the local station apparatus comprises: a plurality of modular, independent automatic station subsystems corresponding in number to the number of subscriber stations served by the switching system. Each station switching subsystem comprises an Automatic Port Selector subsystem (APS), and an Automatic Line Selector subsystem (ALS). Each APS subsystem comprises one or more APS modules corresponding in number to the number of master switching units; and each ALS Subsystem comprises one or more ALS modules corresponding in number to the number of master switching units.

Advantageously, in accordance with my invention, control intelligence and switching function are distributed such that connections for a central office line are managed by its associated master switching unit; and, except for a switching system which comprises a single central office line and a single master switching unit, the switching for each subscriber station is managed by its associated automatic station switching subsystem.

Advantageously, distribution of control intelligence and switching into independent modular system blocks i.e., master switching unit and station switching subsystems in accordance with my invention, permits easy addition and deletion of both central office lines and local stations. Furthermore, malfunctions in the system are self contained in a modular block and are isolated to apparatus associated with a particular central office line or with a particular local station.

In the event that the system in accordance with my invention includes facilities for manual completion of incoming calls from a central office line to a system station, an attendants' module is attached to the Main Port of each master switching Unit; and an attendant answers calls incoming from the central office.

In the event that the system provides automated attendant service, a primary source of a recorded audio announcement (OGM) which advises a calling party how to proceed to complete a call to a particular station served by the called central office number is coupled to the main port of each MSU. In response to subsequent DTMF call signaling information received from its associated central office line, the master switching Unit disconnects the recorded announcement from the central office connection; and connects the calling subscriber to a subscriber station defined by the received call signalling information. In the event that a call cannot be completed, the system provides for backup action to complete the call to an alternate station or to permit a caller to leave a voice message.

Advantageously, the switching system of my present invention comprises arrangements for: completion of a call from a central office line to a subscriber station; automatic connection of a calling subscriber station to an idle central office line; selective interconnection of one subscriber station to another subscriber station as an intra system call; selective add-on of a subscriber station during a call between an incoming call from a central office and a subscriber station or to a connection between two subscriber stations; placing a central office line on hold without benefit of a special telephone set; and transfer of a call to another station.

Additionally, the switching system of my invention economically provides the appearance and features of a business environment to a small business or to a residence served by one or more central office lines and as few as one subscriber station. These features provide screening against unsolicited sales promotion calls and their messages.

Advantageously, my switching system can stand-alone to serve as a PBX or intercom system; or it may be installed as an adjunct to an existing switching system to provide localized enhancement of service of the existing system.

THE DRAWING

FIG. 4 is a schematic drawing of a station switching subsystem e.g., 120 of FIG. 1;

FIG. 5 illustrates the arrangement of FIGS. 2-4;

DETAILED DESCRIPTION

Figure 1:
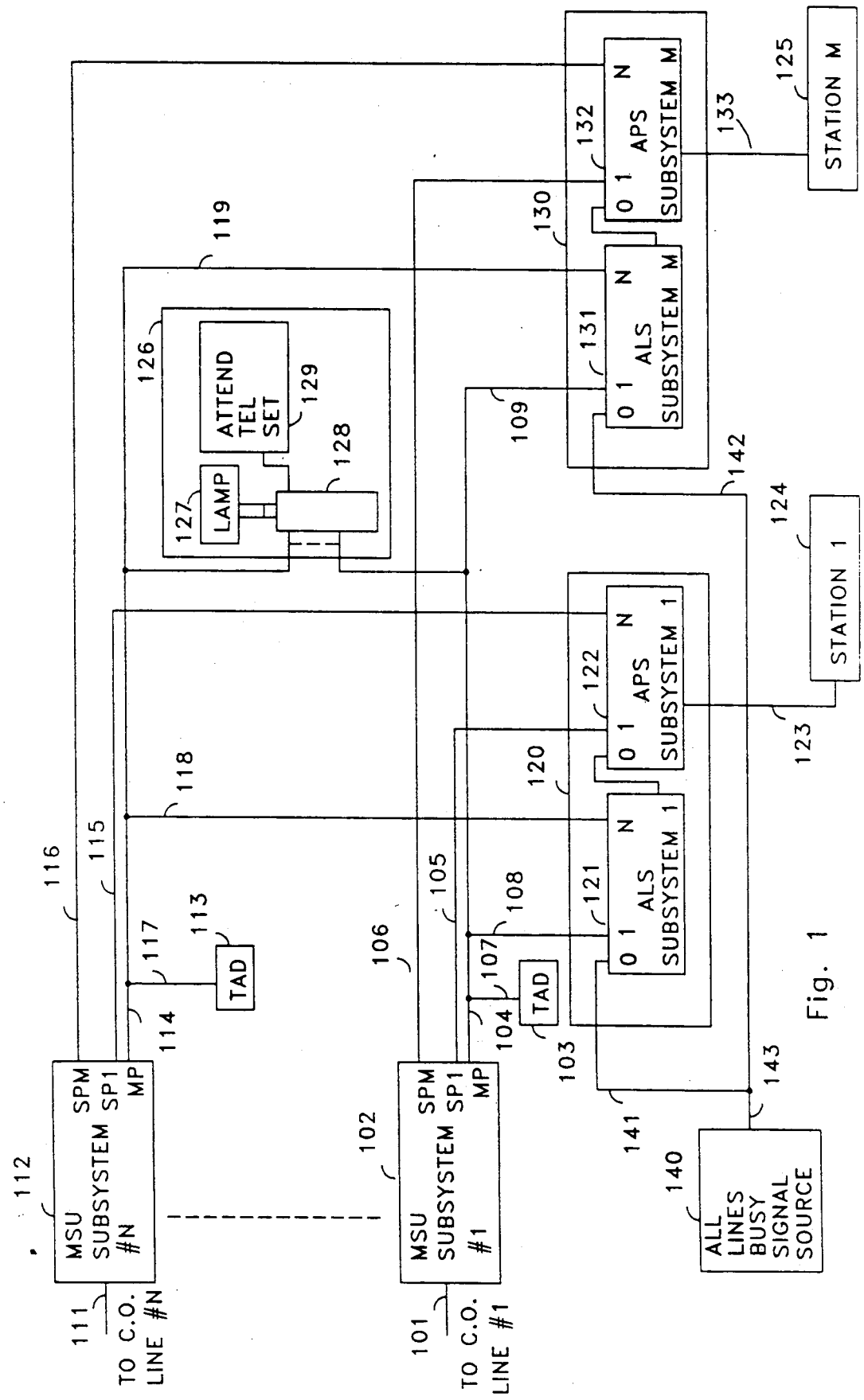
FIG. 1 is a system block diagram of a modular switching system in accordance with this invention.

The block diagram of FIG. 1 illustrates a modular switching system which serves n central office subscriber lines and m subscriber stations. For each central office subscriber line 101, 111 there is a corresponding master subscriber switching unit 102, 112. Similarly, for each subscriber station line 123, 133, there is a corresponding station switching module 120, 130. The arrangements of FIG. 1 provide a non-blocking switching array.

In the case of a system which comprises a single central office line and a corresponding single master switching unit, the subscriber switching subsystem may be eliminated; and the subscriber station sets are connected directly to the station ports of the MSU. This configuration provides both central office to station; and station to station selective calling; however all stations have access to an established talking connection.

The arrangements of FIG. 1 provide the functions of business services generally referred to respectively as "manual attendant service" and as "automated attendant service" in a residential or small business setting. Additionally, subscriber stations 124, 125 connected to lines 123, 133 can originate outgoing calls over the central office subscriber lines 101, 111; originate calls to other stations which are served by the subject switching system; and add parties to calls in progress under control of the subscriber without reliance upon the services of the connected central office or an attendant.

FIG. 1

A brief description of the processing of calls in FIG. 1 will provide a background for a later description of the more detailed schematics of FIGS. 2-4, 6, and 7.

In the illustrative embodiment of FIGS. 1-4, the telephone answering device (TAD) 103, 113 may comprise a manual attendant's module and/or an automatic telephone answering machine with outgoing message and incoming message capability. In the event that a manual attendant's module is provided, the automatic answering machine is arranged to respond after several ringing periods. Therefore, the automatic attendant feature is invoked only if the attendant does not promptly respond to an incoming call from the central office.

The manual attendant's module 126 comprises: an attendant alerting circuit 127 e.g., a lamp circuit which responds to ringing current on each Main Port; an attendant's telephone set 129 i.e., transmitter, receiver, and DTMF pad; and manual switching means for connecting the attendant telephone set to each Main Port.

Upon the occurrence of an incoming call from a central office line, the attendant manually answers the call and attempts to complete a call to a station identified by oral instructions of the calling party. After the attendant dials the number of the identified station, the Master switching unit places the central office line on hold; transmits ringing confirmation tone to the central office line; applies ringing current to the called station; and the Main Port and the attendant's module are removed from the connection. The attendant may then proceed to handle another call.

In the case that automated attendant service is provided, an incoming call from a central office is initiated by ringing current from the central office on one of the central office subscriber lines e.g., 101. The ringing current on the line 101 activates an automatic answering machine in telephone answering device 103 (TAD) to originate transmission of an outgoing voice message (OGM); and alerts the master switching unit 102 to calling activity. The TAD 103 completes a closed D.C. loop to the central office line 101. The closed loop trips ringing in the central office. A loop detector in the master switching unit, to be described later herein, recognizes the loop closure and connects a DTMF receiver to the central office line.

The outgoing voice message (OGM) instructs the caller to use the DTMF pad on the calling telephone to complete a call through the modular switching system. The following is an example of a voice message: "If you are calling from a tone telephone and this is a call for the service department, please dial 18; If this is a call for the sales department, dial 49; or, If you do not have a tone telephone; or, if this is a call for any other department, please wait for the end of this announcement". In the system of the present invention, the switching unit can be customized by the system proprietor to designate the stations with 1 to 4 digits; and to designate the ringing cadence which the system is to employ in alerting the called station.

If the calling party responds by presenting an appropriate number with a DTMF pad, the master switching unit e.g., 102 attempts to complete a call to the selected station. For example, if the call is to station #m which is connected to line 133, the master switching unit e.g., 102 employs the path 106 to determine whether the called station is idle or busy, and if idle, local ringing current of the appropriate cadence is applied to the selected station via path 106, APS subsystem 132 and line 133; and a ring back confirmation tone is returned to the calling subscriber to confirm that action to complete the requested connection has been initiated. If the called station does not answer within a predetermined period of time e.g., 30 seconds, the master switching unit removes ringing and initiates an alternative action. That action may be to divert the call to another station; or to advise the calling party to leave a message. However, if the called station does answer, the MSU establishes a talking connection between the calling central office line and the called station. To provide for a variety of station features e.g., conference call, station transfer, etc. the MSU continuously monitors the connection with a DTMF receiver.

An outgoing call from a station served by the system e.g., a call from station #1 which is connected to line 123, is served by its associated station switching unit 120. The switching unit 120, upon detection of an "off hook" signal from station #1, initiates a search, via the Main Port of the MSU, for an idle central office line to serve the call request. For example, if the unit 120 finds that central office line 111 is idle, that line is selected and made busy. A calling connection between the station #1 and central office subscriber line 111 comprises: APS subsystem 122, ALS subsystem 121, path 118 and MSU 112.

FIGS. 2-7

The switching arrangements of FIG. 1 are shown in greater detail in FIGS. 2-4, 6 and 7. FIG. 5 illustrates the arrangement of FIGS. 2 through 4.

Figure 2:
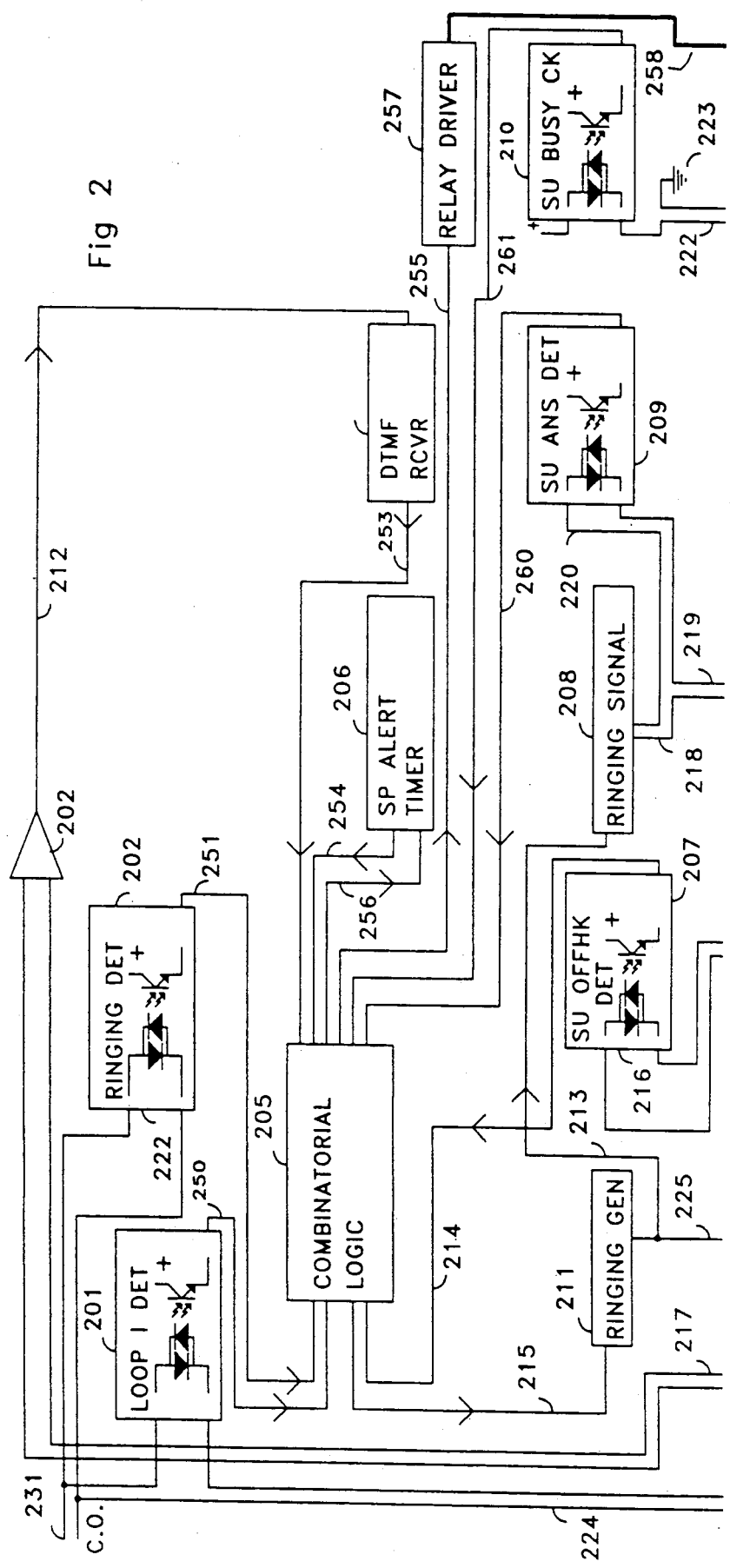
FIGS. 2 and 3 are a schematic diagram of the MSU modules of FIG. 1.
Figure 3:
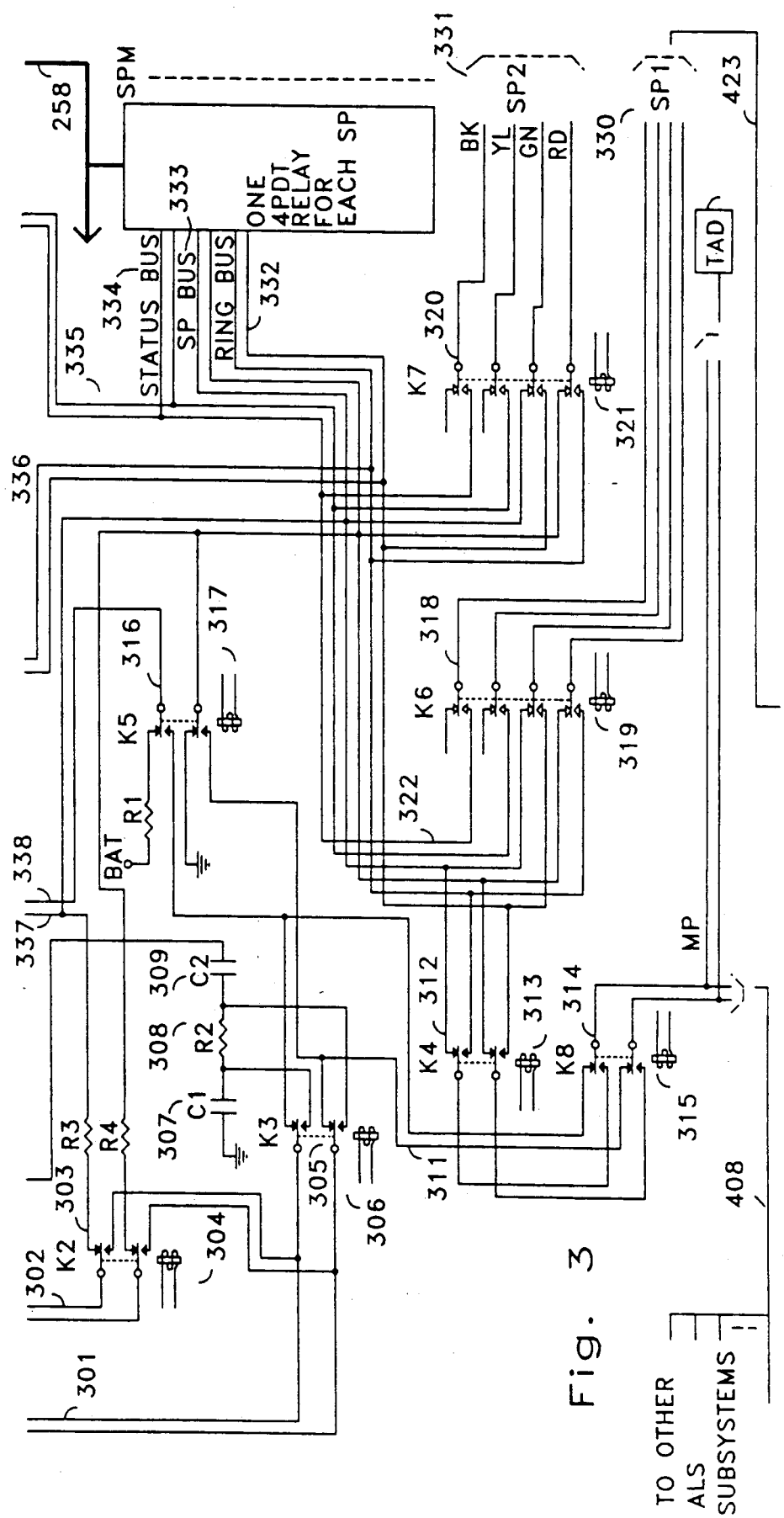

FIGS. 2 and 3 are a schematic diagram of a master switching unit (MSU) e.g., 102 of FIG. 1. The subscriber line pair 231 of FIG. 2, corresponds to each of the pairs 101, 111 of FIG. 1. In the case of master switching unit 102 of FIG. 1, the path 105 corresponds to the path 423 which is connected to the station port SP1 in FIG. 3.

An incoming call from the central office is characterized by the presence of ringing current on a central office line e.g., 231 before the supervisory Loop I detector 201 is activated. The occurrence of ringing current on the line 231 is detected by the ringing detector 204. The output of detector 204 is connected to the combinatorial logic 205 by conductor path 251; and the output of the Loop I detector 201 is connected to the combinatorial logic circuit 205 over path 250.

For purposes of illustration only, the logic arrangements of the block 205 comprise sequential logic circuits, memory, and sources of timing signals to generate output signals for control of the elements of the MSU of FIGS. 2 and 3. The functions of these sequential logic circuits may be implemented by stored program controlled arrangements without departing from the spirit and scope of the invention.

The logic circuit 205, in response to an active signal from ringing detector 204 and a subsequent active signal from Loop I detector 201, energizes coil 304 to operate k2 relay 303. Output signals of relay driver 257 of FIG. 2 are transmitted to the relays of FIG. 3 by the path 258. The distribution of the conductors of the path 258 to the relay coils of FIG. 3 is not shown as such detail would only unnecessarily clutter the drawing. Closure of the make contacts of relay 303 completes a path between the central office line 231 and DTMF receiver 203. The path from the line 231 to DTMF receiver 203 comprises: Loop I detector 201 in series with one wire of pair 224, wire pair 301, an unnumbered pair of make contacts of relay 303, pair 302, pair 217, and amplifier 202.

As call signalling information arrives on the central office line from the calling subscriber, DTMF receiver 203 decodes the signals, digit by digit, and passes the decoded information to combinatorial logic 205. The decoded information which is collected in combinatorial logic 205 is employed to retrieve station translation data stored in combinatorial logic 205. The translation data which is retrieved identifies the physical location i.e., a Station Port (SP) e.g., SP1 which serves the station which is identified by the called number; and identifies the ringing cadence to be used in ringing that station. A plurality of different ringing cadences permit persons in an area with several stations to readily identify which station is being called. Furthermore it is possible to complete calls to different persons to a single station with different ringing signals on the basis of the call signalling information. For example, calls to the station which is reached by a call to the service department provide a first ringing cadence; and calls to the same station which are intended for the sales department provide a second ringing cadence. With this insight, the person answering the call can appropriately tailor the opening greeting.

When the full complement of call signaling information has been collected in logic circuit 205 and the translation completed, logic circuit 205 provides output signals to determine whether or not the called station is idle or busy, and if idle, to initiate the application of a ringing current of the correct cadence to the selected station. Simultaneously, logic circuit 205 activates the alert timer circuit 206 to begin calculation of a "time-out" period of time. In the present apparatus the timeout period can be selectively set in 10 second increments by the proprietor of the switching system.

Upon completion of the translation, logic circuit 205 provides input control signals to relay driver 257 to operate a switching relay associated with the SP which serves the called station. In the case of a call to station which is served by SP 1, an output signal of relay driver 257 operates K6 relay 318. The wiring between FIG. 3 and FIG. 4, by way of example, comprises standard two pair and three pair telephone cables terminated in standard male type modular plugs. In FIG. 4, cable 423, which connects the lowest numbered MSU to the "APSO" module, comprises three wire pairs. The cables 427, 428 each comprise two wire pairs. In each of the cables 423, 427 and 428, a first pair, which comprises the red and green wires, is reserved for speech; a second pair, which comprises the yellow and black wires, forms a station status pair. In cable 423, a third pair formed of a blue wire and a white wire ( not shown in FIG. 3 )is employed to transmit 15 volt A.C. power from the MSU to the APS subsystem of FIG. 4.

Figure 6:
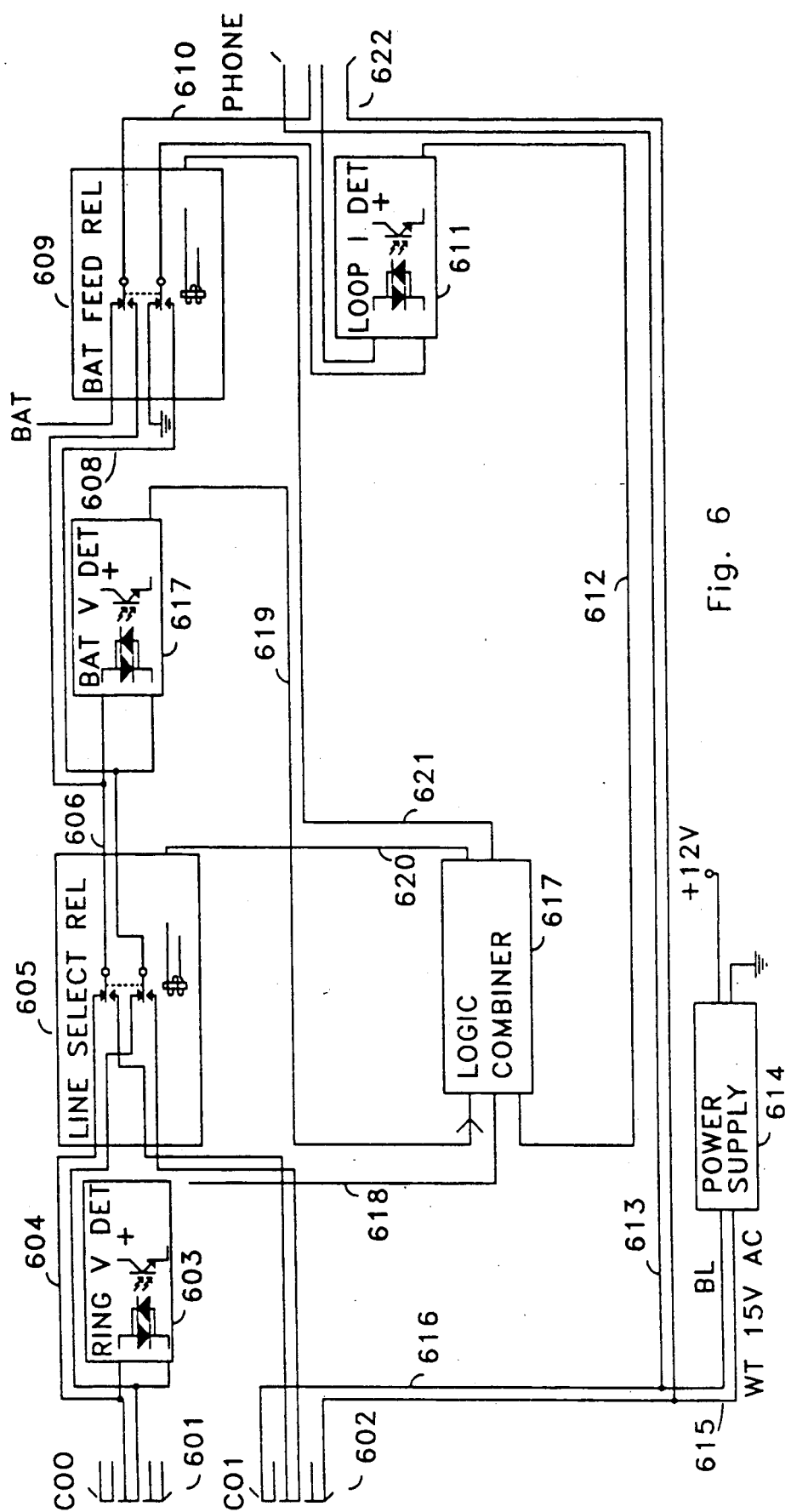
FIG. 6 is a schematic diagram of an ALS module e.g., module 403 of FIG. 4.
Figure 7:
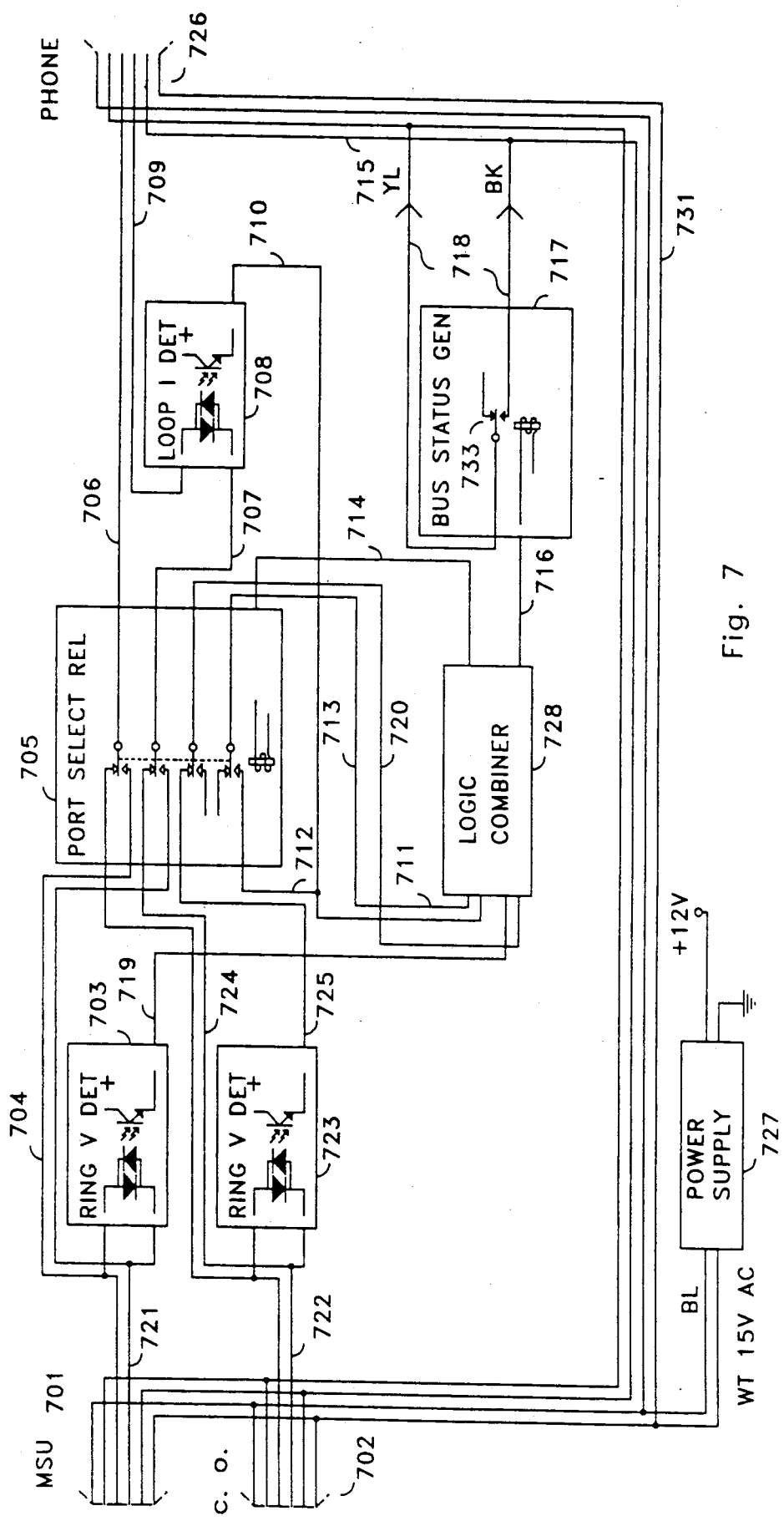
FIG. 7 is a schematic diagram of an APS module e.g., module 422 of FIG. 4.

The APS modules 420 through 422 of FIG. 4 each comprise the circuit arrangements which are shown schematically in FIG. 7. Each APS module includes a power supply 727 to convert 15 volt A.C. power to 12 volt D.C. As noted above herein, the A.C. supply for the APS subsystem is provided by the lowest numbered MSU i.e., MSU #1 of FIG. 1. The 15 volt A.C. power which is received over the blue and white wires of the MSU port of APSO is passed from each APS module to the next over the blue and white wires of the Phone port of the sending module to the blue and white wires of the C.O. port of the receiving module. Similarly, the lowest numbered APS module i.e., module 420 provides A. C. power to the highest numbered ALS modular 403 of FIG. 4 and each ALS module, in turn, passes the A.C. supply voltage to the next lower numbered ALS module via the COI and Phone ports. Each ALS module, as seen in FIG. 6 comprises a power supply 614 to power the logic in the module.

Operation of an SP select relay e.g., K6 relay 318, connects the black and yellow status conductors of the MSU port of APS 420 to the SU Busy Check circuit 210. The busy-signal idle state of the selected station is detected by the SU Busy Check Circuit 210. If the station which is connected to cable 429 of FIG. 4 is busy, a short circuit condition will appear across the black and yellow conductors of cable 423 and if the station is idle, an open circuit condition exists. The bus status generator 717 of FIG. 7 selectively provides the short circuit and open circuit conditions between the black and yellow status conductors. A short circuit condition across these conductors serves to complete a current path for the input of SU busy check circuit 210 to ground 223. The connecting path comprises the black and yellow conductors of cable 423, a pair of make contacts of relay 318, conductor pair 322, conductor pair 335 and pair 222. The electrical condition of the output of the SU Busy Check circuit 210 on conductor 261 indicates to the logic circuit 205 that the selected station is idle or busy.

If the called station is found to be busy, the logic circuit 205 generates control signals to release the operated port select relay e.g., K6 relay 318; and to connect the calling central office line to a backup line for the busy called station. The backup facility, as defined by data stored in logic circuit 205, may be a line connected to a telephone, an attendant's position or a telephone answering set. In any event, the process to complete a call to the backup facility proceeds the same as described above.

If the first called station is idle, logic circuit 205 generates control signals to apply ringing current to the called station via that station's APS subsystem; return a confirmation tone to the calling central office line; and enables SP alert timer 206 to initiate measurement of a timeout period of time e.g. 30 seconds. The timeout period of time is the maximum time that ringing current is applied to a station which fails to answer.

Output signals of logic circuit 205 on path 215 control ringing generator 211 to generate ringing signals of the correct cadence. Output signals of ringing generator 211 on conductor 225, by means of the network consisting of capacitor 307, resistor 308, and capacitor 309, provides confirmation tone at the pair of make contacts of the K3 relay 305. A further signal of logic circuit 205 energizes coil 306 of K3 relay 305 to connect the confirmation tone to the calling line.

The ringing signal circuit 208 electrically conditions output signals of the ringing generator 211 on conductor 213 to provide ringing current to the called station. The station answer detector 209 is connected in series with one conductor of the output of the ringing circuit 208. In the MSU of FIGS. 2 and 3, the path for transmission of ringing current comprises: conductor 220, answer detector 209, conductors 218 and 219, cable 336, ringing bus 332, the lower pair of make contacts of the selected port select relay e.g., K6 relay 318, and the red and green conductors which connect the make contacts to port SP1. Cable 423 connects port SP1 to the MSU port of APS module 420.

FIG. 7 is a schematic drawing of an APS module i.e., modules 420, 421 and 422 of FIG. 4. Each APS module comprises: a pair of ringing detectors 703 and 723 for monitoring the MSU and C.O. ports for the presence of a ringing signal; a loop current detector 708 for detecting the presence of a closed D.C. loop condition on the red and green conductors from the phone port 726; a bus status generator 717 for selectively closing a path between the yellow and black status conductors 718 which are connected to terminals of MSU port 701, C.O. port 702 and phone port 726; a port select relay 705 for selectively connecting the red and green conductors of the phone port 726 to the red and green conductors of the MSU port 701 or the C.O. port 702; and a combinatorial logic circuit 728 which controls the line select relay 705 and the bus status generator 717.

If no ringing current appears at either MSU port 701 or C.O. port 702, relay 705 is not energized and the red and green conductors (the speech path) of the C.O. port 702 are connected to the red and green conductors of phone port 726 over a path which includes loop current detector 708. However, if ringing current appears at MSU port 701, relay 705 is energized and the red and green conductors of the MSU port are connected to the red and green conductors of phone port 726.

In the presence of ringing current at C.O. port 702, ringing detector circuit 723 provides an active signal on its output conductor 725. That signal is transmitted to the C.O. Ring terminal of logic circuit 728 over a path which includes conductor 725, a break contact of relay 705, and conductor 720. In response to these signals, logic circuit 728 generates a signal to energize relay 733 of the bus status generator 717. Operation of relay 733 shorts the yellow and black conductors to indicate that the APS is busy. An active signal at the C.O. ring terminal of the logic circuit 728 and a subsequent active signal at the Loop I detect terminal 710 indicates that the called station has answered. The logic circuit 728 latches the bus status generator 717 at the busy state.

In the presence of ringing current at MSU port 701, ringing detector circuit 703 provides an active signal on its output conductor 719 and thus to the MSU ring terminal of the logic circuit 728. The logic circuit 728, in turn generates an output signal via path 714 to energize the coil of line select relay 705. Simultaneously, a busy signal is sent from logic combiner 728 to bus status generator 717 to operate relay 733 to short the yellow and black conductors. If the called station answers, the output of loop I detector 708 is transmitted to both the loop I and loop I' terminals of circuit 728. The logic can thus distinguish between answer of a call from the C.O. port and a call from the MSU port. That is, based on the state of Loop I', relay 705 is latched in the operated position even after the output of ring detector 703 goes inactive when the called station answers. Also, the bus status generator 717 is latched in the busy position as long as the output of Loop I detector 708 is active.

On the basis of the above description of the APS module of FIG. 7, it is seen that upon receipt of a ringing signal on the MSU port of APS module 420, the MSU port is connected to the phone port thereof to pass the ringing current to the C.O. port of the next APS module 421. That module and each succeeding module passes the speech path with the ringing signal thereon to the following module and the highest numbered APS module 422 passes the ringing signal to the station connected to line 429. When the called station answers the call, the loop current detector 708 in each APS module generates an active output signal on its conductor 710; the associated relay 733 in the bus status generator circuit is latched. Accordingly, the busy condition on the black and yellow conductors is presented to all MSU ports of the station switching subsystem. Thus, no MSU will attempt to complete a call to the busy station.

When the called station answers the call, the SU Answer detector 209 in the MSU recognizes the change and generates an active signal on conductor 260. The combinatorial logic 205, in turn: removes the active signal from conductor 215 to terminate the generation of both the confirmation tone and the ringing signal; operates the K4 relay 312 and the K1 relay 314 to connect the main port (MP) and TAD 103 to the ring bus 332; operates K5 relay 316 to remove local battery from the SP bus; releases K3 relay 305 to connect the C.O. port 231 to SP bus 333; releases the previously operated K6 relay 318 to connect the associated station port SP1 to the SP bus 333; and releases the K2 relay 303 to connect amplifier 202 and the DTMF receiver 203 to the SP bus. Under these operating conditions, the party connected to the C.O. line 231 and the station connected to the selected line 429 are connected for communication; the DTMF receiver 203 is ready to receive further call signalling information from the local station to permit the local party to initiate a conference/consultation/transfer call; and TAD 103 is isolated from the talking path.

During the duration of a conversation connection, regardless of whether the connection was established while serving a central office to extension call, an extension to extension call, or an extension to a central office call, the SP bus 333 is constantly monitored by the DTMF receiver 203.

To initiate a conference/consultation call, the party at the local station, by means of the local DTMF pad, generates a "#" signal. The DTMF receiver 203 indicates receipt of a "#" signal to the combinatorial logic 205 by a signal over the path 253. The control logic 205, in turn, generates signals to reconfigure the connection in preparation for receipt of further call signalling information. In the case of a connection which involves a central office line e.g., the line connected to port 231, the control logic 205 generates control signals to: operate the K3 relay 305 to put the central office line on hold with the resistance 308; release the K5 relay 316 to provide local battery and ground to the extension which was part of the connection. If the party at the subject extension generates further call signalling information, that information is recognized by the DTMF receiver 203 and accumulated in the logic circuit 205. If the accumulated information matches a valid number of the system, a port select relay e.g., K7 relay 320 is operated to connect Station Port SP2 to the ring bus 332; and ringing current, as described above with respect to a central office to extension call, is applied to the newly selected extension. The ringing connection is monitored by the SU answer detector circuit 209. If the called extension answers, the circuit 209 places an active signal on path 260. The logic circuit 205, in turn, terminates generation of the ringing signal and releases K7 relay 320 to connect the selected Station Port SP2 and the extension connected thereto to the SP bus and thus to the Station Port SP1 and the extension connected thereto. The parties at the two extensions can converse privately since the central office line is excluded from their connection. Upon completion of consultation, the station again generates a "#" signal. Upon receipt of that signal, the logic circuit 205 generates control signals to: operate the K5 relay 316 to remove local battery and ground from the extension, and releases the K3 relay 305 to bring the party connected to the central office line into the conversation, thus forming a conference connection.

If the called station does not answer a call from the central office within the prescribed timeout period of time as defined by the timeout timer 206, the combinatorial logic 205 can initiate an alternative action. As defined in the logic 205 of the master switching Unit, the logic 205 may attempt to complete a call to alternate local station; alert the calling party to select another station or to leave a message as illustrated in the following discussion.

By way of example, if the called station does not answer within the timeout period of time, ringing and confirmation tone are terminated, and TAD 103 and its OGM are reconnected to the calling C.O. line. The logic 205 accomplishes these actions by the following: stops ringing generator 211 and ringing signal circuit 208; releases the K6 relay 318 to disconnect the called station port SP1 from the ring bus 332; operate the K4 relay 312 and the K1 relay 314 to connect the ring bus and the ringing signal source 208 to the main port MP and thus to the TAD 103; and when the SU ANS detector 209 recognizes that TAD 103 has gone to the off-hook state, the logic 205 generates control signal to release the K4 relay 312, the K1 relay 314 and the K3 relay 305; and operates the K2 relay 303. The TAD 103 transmits its outgoing message to the calling central office line and the calling party may generate a new call signalling sequence to choose a new station; wait for the completion of the OGM so that a voice message may be recorded on the Incoming Message (ICM) portion of the TAD; or may hang up to terminate the transaction. If the calling party hangs up and thus releases the central office line, the loop I detector 201 goes inactive and the control logic 205 resets the MSU to await another call.

Station to station and station to central office calls can be originated by a subscriber at an idle station through the services of its associated ALS subsystem and of the MSU associated with the first idle central office line. From the viewpoint of a line switching system, a station is considered to be idle when none of the associated APS modules is receiving ringing current from either the MSU port or the C.O. port thereof. When a line to a station is idle, the speech conductors (red and green wires) of the phone port of the highest numbered APS module are connected serially through the APS modules to the red and green conductors of the C.O. port of the lowest numbered APS module. Accordingly, the station connected to the line 429 is connected to the phone port of the highest numbered ALS module 403.

Each ALS subsystem e.g., 121 comprises a plurality of ALS modules (FIG. 6) corresponding in number to the number of master switching units in the switching system. An ALS subsystem is employed to selectively connect an off hook subscriber station to an idle central office line. As seen in FIG. 6, each ALS module comprises a phone port 622, a CO0 port 601, and a CO1 port 602. The phone port of the highest numbered ALS module is connected to the C.O. port of the lowest numbered APS module of the same station switching subsystem by a four wire cable which comprises a speech pair (the red and green wires) and a 15 volt AC power feed pair the blue and white wires). Each ALS module like the APS module of FIG. 7, comprises a 15 volt AC to 12 volt DC power supply 614 to provide power for the module.

The CO0 port of each ALS module is connected to a main port (MP) of a master switching unit (MSU) by a two wire cable; and the CO1 port of each ALS module, other than the lowest numbered module, is connected to the phone port of the next lower numbered ALS module by a four wire cable. The CO1 port of the lowest numbered ALS module is connected to All Lines Busy tone source 140. The 15 AC supply voltage is passed from each ALS module to the next lower numbered module via the blue and white conductors of the four wire cable running from the CO1 port of the higher numbered module to the phone port of the next succeeding module. It is to be noted that the CO0 ports of the same numbered ALS modules of each station switching subsystem are connected in parallel to the Main Port (MP) of the correspondingly numbered MSU.

From the viewpoint of an ALS module, a central office line is considered to be idle when the battery detect circuit 607 has an active output signal and the ringing voltage detect circuit 603 generates an inactive output signal to the logic circuit 617 over conductors 619 and 618 respectively. Since a ringing signal from a central office comprises both active and silent intervals, the logic 617 retains a record of ringing during silent intervals which follow an active period. A local station initiates a request for service by going from the on-hook state to the off-hook state. In the off-hook state the station provides a closed DC path across the station line conductors. As seen in FIG. 6, the red and green conductors of the phone port 622 terminate in ground and battery potentials through back contacts of the battery feed relay 609. The red conductor is in series with a photo diode in the loop current detector circuit 611. When a station goes off-hook, current flowing in the station loop causes the photo diode to illuminate a photo transistor in the loop current detector circuit 611 and thus generates an active signal on conductor 612. In the event that the C.O. line is idle, logic circuit 617, in response to an active signal on conductor 612 generates a signal to operate battery feed relay 609 to remove local battery from the station line and to connect the station through to the CO0 port. Connection of the station requesting service to the central office is completed over the red and green conductors of cable 408, the MP of the MSU which serves the selected idle line, back contacts of relay 314, pair 311, back contacts of relay 305, pair 301, loop current detector 201 and central office port 231. Dial tone from the central office is supplied to the requesting station. The loop current detector 201 recognizes the closure from the station and generates an active signal on conductor 250. The logic circuit 205 generates control signals to operate k5 relay 316 to connect SP bus 333; and operate K2 relay 303 to connect amplifier 202 and DTMF receiver 203 in circuit with the connection between the station and the selected central office line. Under these conditions DTMF receiver 203 monitors call signalling information from the station. However, if the call is to a station of the connected public network, apparatus in the central office accumulates the call signalling information and completes a connection between the requesting station and the station defined by the call signalling information; and the MSU takes no action. If none of the C.O. lines is idle, the ALS subsystem connects the requesting station to the all lines busy signal source 140. Upon hearing busy tone, the caller can go on hook and try the call later.

However, in the case of an internal call to another local station, the station generates an initial prefix signal e.g; a "#" signal. The logic circuit 205 in response to the prefix signal generates control signals to: operate K3 relay 305 to disconnect the station from the central office line and make that line busy by bridging R2 resistor 308 across the line. This prevents the central office from placing calls over that c.o. line during the term of the local station to station call. Additionally, logic 205 releases K5 relay 316 to connect the station to local battery, and operates K1 relay 314 to connect the main port MP to the SP bus 333. The logic circuit treats the accumulated call signalling information from the requesting station as data defining a local station and performs a translation of the accumulated data to select the called station. A line select relay in the MSU e.g., K7 relay 320 is operated and, as in the case of an incoming call, ringing current is generated if the called line is idle. The completion of a station to station call from this point in time follows the earlier description of completion of an incoming call from a central office line. When the connection is established between two stations, K3 relay 305 is operated and K1 relay 314 and K5 relay are released. Therefore, after a station to station connection is established, local talking battery is supplied through K5 relay 316 ; and amplifier 202 and DTMF receiver 203 monitor the connection for further call signalling information to initiate a conference/consultation/transfer call.

Accordingly, a subscriber at one of the connected stations can generate a "#" signal and signals which define another station of the system to request completion of a conference/consultation/transfer call. The service of such a request proceeds as described earlier herein in the case of such a request during a central office line to station connection.

In the case of a minimum system which comprises a single central office line and a corresponding single master switching Unit, the station switching subsystem comprising ALS and APS modules is eliminated from the switching system; and the subscriber station sets are directly connected to the station ports of the MSU. The minimum configuration provides all of the calling features described above, namely, selective connections from the central office line to any local station; selective connection of any local station to another local station; connection of any local station to the central office line if the central office line is idle; and a party at a local station engaged in a connection can initiate consultation/conference/transfer calls.

However, in the minimum system, because the station sets are directly connected to the Station Ports, e.g., SP1, SP2 of FIG. 3 without benefit of the station switching subsystem of FIG. 4, certain aspects of system operation are to be noted.

A standard local station set comprises only the red and green wire pair for speech, therefore the status bus 334 and the SU Busy CK circuit 210 are not available to the MSU in the processing of a call to a local station.

Accordingly, in the case of a call from a Central Office line to a station, the MSU processes a call as described above herein; however, the MSU checks the state of the SU OFHK detector circuit 207 on output conductor 214 before a desired station port e.g. SP1 is connected to the ring bus 332. If output conductor 214 is in the active state, it indicates that one or more of the stations has gone off hook between the time that the central office line seized the MSU to complete a call and the time the state of the SU OFHK detector 214 is noted. In that case, ringing current cannot be applied since there is no way of assuring that an off hook station has not been selected. If the station is busy, logic 205 proceeds to alert the MP port with ringing current. The call may then proceed as previously discussed in the case of call timeout. If output 214 is found inactive, K6 relay 318 is activated and ringing current is applied to the station on SP1. Additional operation steps coincide with the previous description.

When the single MSU is idle and a local station goes off hook, the loop between the red and green wires on the corresponding SP port is closed and current flows through the SP bus and the SU OFHK Detect 207 which generates an active signal on path 214 to the combinatorial logic 205. In response to the active signal, logic 205 energizes coil 317 to operate K5 relay 316 to transfer the SP bus from the local talking battery to central office line 301.

By following the path 311 and break contact of K1 relay 314, it is clear that the station requesting service is electrically at the same position as a station set connected to the main port (MP). Thus, request for service can be carried out as described previously.

This provides a similar convenience as the "extension" telephones around a traditional residence due to the "daisy-chain" telephone cable wiring convention. Thus, any telephone can join a conversation at any time by simply going off hook on that station set. Furthermore, a station can answer a call even if the ringing current is applied to alert another station; however, privacy protection is compromised under this configuration.

The invention has been described with particular attention to its preferred embodiment; however, it should be understood that variations and modifications within the spirit and scope of the invention may occur to those skilled in the art to which the invention pertains. For example, two or more stages of master switching units may be interposed between a central office line and a group of subscriber station. In that case, a caller from a central office line may be guided by outgoing messages of two or more TAD's to progress through a switching hierarchy to select a station. Additionally, during the course of a station to station call, instead of placing a central office line on hold, the line may be automatically connected to a spare master switching Unit to utilize the services of the line.

What is claimed is:

1. A modular automatic telephone switching system for serving one or more central office lines from a central office and one or more local stations comprising:
   one or more master switching units corresponding in number to the number of central office lines to be served by the system and associated with said central office lines on a one for one basis; and wherein each master switching unit comprises:
   a central office port;
   a main port;
   station port means for connection to local station apparatus; the station port means corresponding in number to the number of local stations served by the telephone switching system;
   switching means for selectively interconnecting said central office port, said main port, and said station port means;
   interconnecting means for selectively interconnecting said station port means; and
   control means for controlling said switching means and said interconnecting means.

2. A modular automatic telephone switching system in accordance with claim 1 wherein:
   said local station apparatus comprises:
   one or more automatic station switching subsystems corresponding in number to the number of stations served by the telephone switching system; and
   said automatic station switching subsystems each comprise: an automatic port selector subsystem and an automatic line selector subsystem.

3. A modular automatic telephone switching system in accordance with claim 2 wherein:
   each automatic port selector subsystem comprises a plurality of automatic port selector modules corresponding in number to the number of master switching units in the switching system; and wherein:
   each automatic line selector subsystem comprises a plurality of automatic line selector modules corresponding in number to the number of master switching units in the switching system.

4. A modular automatic telephone switching system in accordance with claim 1 wherein:
   said local station apparatus comprises:
   one or more standard subscriber telephone sets.

5. A modular automatic telephone switching system in accordance with claim 1 wherein:
   said system further comprises:

call answering means connected to the main port of each master switching unit for responding to calls originating from a central office line connected to the central office port of said master switching unit.

6. A modular automatic telephone switching system in accordance with claim 5 wherein:
said call answering means comprises manual attendant'module means coupled to the main port of each master switching unit; and wherein
said attendant's module means comprises:
an attendant's telephone set and means for selectively connecting said attendant's telephone set to said main ports.

7. A modular automatic telephone switching system in accordance with claim 5 wherein:
said call answering means correspond in number to the number of master switching units in the telephone switching system and associated with said master switching units on a one for one basis; and wherein: each call answering means comprises an automatic telephone answering set for selectively generating outgoing voice messages corresponding to voice messages stored in said answering set; and for recording incoming voice messages.

8. A modular automatic telephone switching system in accordance with claim 7 wherein:
each of said call answering means comprises: means responsive to ringing current from said central office for selectively generating said outgoing voice messages for transmission to said central office; and wherein:
each master switching unit further comprises: means responsive to call signalling information received from the central office line connected to said central office port for disconnecting said call answering means from said central office port and for selectively connecting said central office port to a station port means defined by the received call signalling information.

9. A modular automatic telephone switching system in accordance with claim 1 wherein:
each master switching unit comprises:
DTMF receiver means for detecting DTMF calls signalling information and for generating corresponding output signals;
means for selectively connecting said DTMF receiver means to said central office port and to said station port means;
means for generating and storing signals corresponding to said output signals; and
means in said control means for interpreting said signals corresponding to said output signals.

* * * * *